(12) United States Patent
Watanabe et al.

(10) Patent No.: US 6,267,137 B1
(45) Date of Patent: Jul. 31, 2001

(54) BALL CHECK VALVE AND PUMPING APPARATUS USING THE CHECK VALVE

(75) Inventors: Osamu Watanabe; Yasunori Sugita, both of Kitakoma-gun (JP)

(73) Assignee: Kitz Corporation, Chiba-ken (JP)

( * ) Notice: Subject to any disclaimer, the term of this patent is extended or adjusted under 35 U.S.C. 154(b) by 0 days.

(21) Appl. No.: 09/457,478

(22) Filed: Dec. 9, 1999

(30) Foreign Application Priority Data

Dec. 9, 1998 (JP) .................................................. 10-349428
Mar. 1, 1999 (JP) .................................................. 11-053313

(51) Int. Cl.[7] .................................................. F16K 15/04
(52) U.S. Cl. .................................. 137/533.11; 137/565.33
(58) Field of Search .............................. 137/533.11, 533, 137/565.33

(56) References Cited

U.S. PATENT DOCUMENTS

| | | | |
|---|---|---|---|
| 187,373 | * | 2/1877 | Goodwin et al. ................ 137/533.11 |
| 193,605 | * | 7/1877 | Hay .................................. 137/533.11 |
| 203,590 | * | 5/1878 | Colborne ......................... 137/533.11 |
| 382,655 | * | 5/1888 | Montgomery .................... 137/533.11 |
| 841,474 | * | 1/1907 | Wendelken ...................... 137/533.11 |
| 975,243 | * | 11/1910 | Hitchcock ....................... 137/533.11 |
| 976,078 | * | 11/1910 | Hollis .............................. 137/533.11 |
| 1,013,695 | * | 1/1912 | Storer et al. ..................... 137/533.11 |
| 1,134,717 | * | 4/1915 | Armstrong ....................... 137/533.11 |
| 1,700,234 | * | 1/1929 | McCrosky ........................ 137/533.11 |
| 3,105,516 | * | 10/1963 | Werra et al. ..................... 137/533.11 |
| 3,112,760 | * | 12/1963 | Budd ................................ 137/565.33 |
| 4,007,710 | * | 2/1977 | Johnson ........................... 137/533.11 |
| 4,501,292 | * | 2/1985 | Maloblocki ...................... 137/533.11 |
| 4,687,023 | * | 8/1987 | Harbison et al. ................ 137/533.11 |
| 5,709,242 | * | 1/1998 | Bergen ............................. 137/533.11 |

FOREIGN PATENT DOCUMENTS 10-231941   9/1998 (JP) .

* cited by examiner

Primary Examiner—John Rivell
(74) Attorney, Agent, or Firm—Wenderoth, Lind & Ponack, L.L.P.

(57) ABSTRACT

A ball check valve includes a body having a flow path and a turnout path formed therein and provided on a primary side thereof with an inlet and on a secondary side thereof with an outlet. A ball in the body a seating part for the ball, disposed in the inlet of the body and inclined toward the primary side in a state having the flow path laid horizontally, and a guide part provided with a part for causing the ball seated at the seating part to be retracted into the turnout path and guiding the retracted ball to the seating part, are provided. A pumping apparatus for discharging a fluid from a storage tank includes a pump alternating motions of pumping and stopping for controlling the fluid in the storage tank to a predetermined amount, a piping for discharging to the exterior the fluid of the storage tank being forwarded by the pump, and a ball check valve disposed on the piping and adapted to prevent the discharged fluid from flowing backward during stoppage of the pump.

16 Claims, 13 Drawing Sheets

BALL CHECK VALVE AND PUMPING APPARATUS USING THE CHECK VALVE

BACKGROUND OF THE INVENTION

1. Field of the Invention

This invention relates to a ball check valve for use in pipes handling fluids such as service water, medium water, sewage water, agricultural water, dirty water, plant effluent, miscellaneous effluents, oils and gases; and to a pumping apparatus using the ball check valve for the purpose of pumping such liquids and oils in a sewage tank, a manhole pumping station, a reservoir, etc.

2. Description of the Prior Art

The ball check valve of this kind comprises a ball formed by closely encompassing a metallic sphere with a coat of rubber or resin and built in a body, an inlet and an outlet inserted in the body, a ball seating part and a guide part adapted to guide a ball and disposed inside the body, and achieves the purpose of causing the ball, when a fluid is in normal flow, to be retracted to a position incapable of offering obstruction to the flow of the fluid and, when the fluid is stopped, to be moved under its own weight to a closing position.

This check valve is usable only in a vertical pipe having the secondary side thereof turned upward and is unusable in a pipe laid in a horizontal state. Particularly, the guide part which is disposed inside the body, being made of cast metal, does not always have a constant size and position and, therefore, is generally so positioned as to give the ball free room relative to its diameter. When this check valve is set in a horizontal state which emits no load, therefore, it cannot be effectively used in a horizontal pipe because the horizontal state possibly prevents the ball from contacting the seating part.

One of the inventors in this instance has already proposed an invention pertaining to this ball check valve in JP-A-10-231,941.

The invention of this prior patent publication contemplates preventing the ball from flowing through the outlet or inlet into the pipe by causing the minimum sizes of the inlet and the outlet of the body in the direction of diameter to be smaller than the diameter of the metallic sphere. Though the prior invention is intended to be used mainly in a vertical pipe, it additionally proposes a construction which, for the purpose of allowing application to a horizontal pipe as well as to a vertical pipe, is provided near the seating part with a projecting part capable of causing the ball to collide against the seating part when the fluid ceases normal flow and the ball consequently moves to the position for closing the valve.

According to the prior patent publication, since the horizontal pipe under discussion has the seating part thereof disposed perpendicularly to the center of the flow path, the ball is not easily set in position on the seating part during the absence of load. Particularly when a large reverse current occurs, though the ball is indeed seated, it possibly induces water hammer. Conversely, if the reverse current is unduly small, the ball will not be seated so effectively as to afford perfect closure of the flow path.

A ball check valve is adopted for various applications. When it is used for a pump system in a manhole, for example, the submersible pump is provided in the upper part thereof with two (or one) pumping functions and is operated to pump up the fluid stored in the manhole and control the amount of the stored fluid at a constant level. After the pump is stopped, the check valve is set in a closed state to prevent the fluid from flowing back.

Generally in this case, the pipe which interconnects the check valve and the pump is provided with an air vent valve besides the check valve so as to allow a constant flow of air through the pipe.

Particularly when the pump is stopped, the pressure of the water head on the secondary side pipe actuates the check valve and closes it. In this case, the check valve fails to function in the absence of a pressure difference between the primary side and the secondary side. Specifically, since the pumping system requires the pressure on the primary side to be duly small and necessitates extraction of the water in the primary side pipe by means of the pump, for example, it becomes necessary first of all to extract the air entrapped in the primary side pipe through the air vent valve.

Also, when the pump is actuated to start pumping the water, it is necessary to extract the air promptly through the air vent valve because the presence of air in the pipe results in degrading the capacity of the pump.

Thus, the pumping system is adapted to rely on the air vent valve to extract the air contained in the pipe interconnecting the check valve and the pump.

The desirability of integrating the air vent valve with the check valve instead of disposing the air vent valve independently of the check valve has been advocated. The proposed integration has not yet been realized because it possibly results in enlarging the check valve itself and altering the interfacial dimensions of the valves in question and deprives the valves of exchangeability with the conventional supplies by reason of size.

Particularly, the manhole pumping system which is designed for alternately actuating two parallel lines each formed of a series of pumping and reverse flow preventing parts cannot be applied to the conventional manhole because this system abounds in component elements including pipes and because the change in layout of the system incurs a very high cost.

Incidentally, when the ball check valve of this kind serves a submersible pump which is propelling dirty water containing pebbles of a general size in the approximate range of 5–10 mm, since the ball of the ball check valve is moved toward the guide side in concert with the dirty water entraining the pebbles, the possibility of the pebbles being nipped between the ball and the guiding part is undeniable. Consequently, the ball fails to land on the seating part of the valve box.

This situation is depicted in FIG. 22. With reference to the diagram, when a pebble 51 is engulfed into the gap between a ball 52 and a guiding part 53 in a valve box 54, the pebble 51 is suffered to restrain the movability of the ball 52. Once this situation develops, the ball 52 fails to fall down and land exactly on the valve seat even when the pump ceases to discharge the fluid. The check valve possibly fails to fulfill the function thereof. The inconvenience caused by the pebble 51 defies solution because the pebble 51 cannot be removed by resuming the operation of the pump.

An object of this invention is to provide a ball check valve which allows a ball to be infallibly seated even when the ball check valve is laid in a horizontal pipe.

A further object of this invention is to provide, with a view to meeting the demand for an integral check valve assembly, a ball check valve of high practical value, which is endowed with a construction such that an air vent function on the primary side is enabled to be added to a check valve without requiring any enlargement of the check valve and the ball check valve is enabled to retain compactness and enjoy exchangeability of the component parts thereof with conventional supplies.

Another object of this invention is to provide a ball which is enabled, even when extraneous matter such as a pebble happens to reach a point of being possibly nipped between the ball and the guiding part in the body, to move under its own weight infallibly to the seating part in the body and prevent the extraneous matter from being engulfed between the ball and the guiding part.

Yet another object of this invention is to provide a pumping apparatus which permits the ball check valve of this invention to be applied even to a conventional manhole.

SUMMARY OF THE INVENTION

According to one aspect of the invention, there is provided a ball check valve comprising a body having a flow path and a turnout path formed therein and provided on a primary side thereof with an inlet and on a secondary side thereof with an outlet, a ball built in the body, a seating part for the ball, disposed in the inlet of the body and inclined toward the primary side in a state having the flow path laid horizontally, and a guide part provided with a part for causing the ball seated at the seating part to be retracted into the turnout path and guiding the retracted ball to the seating part.

According to another aspect of the invention, there is provided a ball check valve comprising a body having a flow path and a turnout path formed therein and provided on a primary side thereof with an inlet and on a secondary side thereof with an outlet, a ball built in the body, a seating part for the ball disposed in the inlet of the body, a guide part for causing the ball seated in the seating part to be retracted into the turnout path, an outside opening formed on a pipe connecting part side of the inlet of the body, an inside opening formed between the inlet and the seating part, and a communicating path permitting communication between the outside opening and the inside opening.

According to still another aspect of the invention, there is provided a ball check valve comprising a body having a flow path and a turnout path formed therein and provided on a primary side thereof with an inlet and on a secondary side thereof with an outlet, a ball built in the body, a seating part for the ball, disposed in the inlet of the body and inclined toward the primary side in a state having the flow path laid horizontally, and a guide part for guiding the ball to the seating part, an apex of a longitudinal line of the ball intersecting a direction of the flow path for a fluid and an inside surface of the guide part opposed to the longitudinal line forming therebetween a gap larger than a size of an extraneous substance mingling into the fluid.

According to yet another aspect of the invention, there is provided a pumping apparatus for discharging a fluid from a storage tank comprising a pump alternating motions of pumping and stopping for controlling the fluid in the storage tank to a predetermined amount, piping for discharging to the exterior the fluid of the storage tank being forwarded by the pump, and a ball check valve disposed on the piping and adapted to prevent the discharged fluid from flowing backward during stoppages of the pump.

According to further aspect of the invention, there is provided a pumping apparatus further comprising pumping and reverse flow preventing parts each formed by including the pump, piping, and check valve parallelly disposed and operated to alternately fulfill pumping and reverse flow preventing functions.

DETAILED DESCRIPTION OF THE INVENTION

One example of a ball check valve according to the present invention will be specifically described below with reference to FIG. 1 to FIG. 6.

Figure 1:
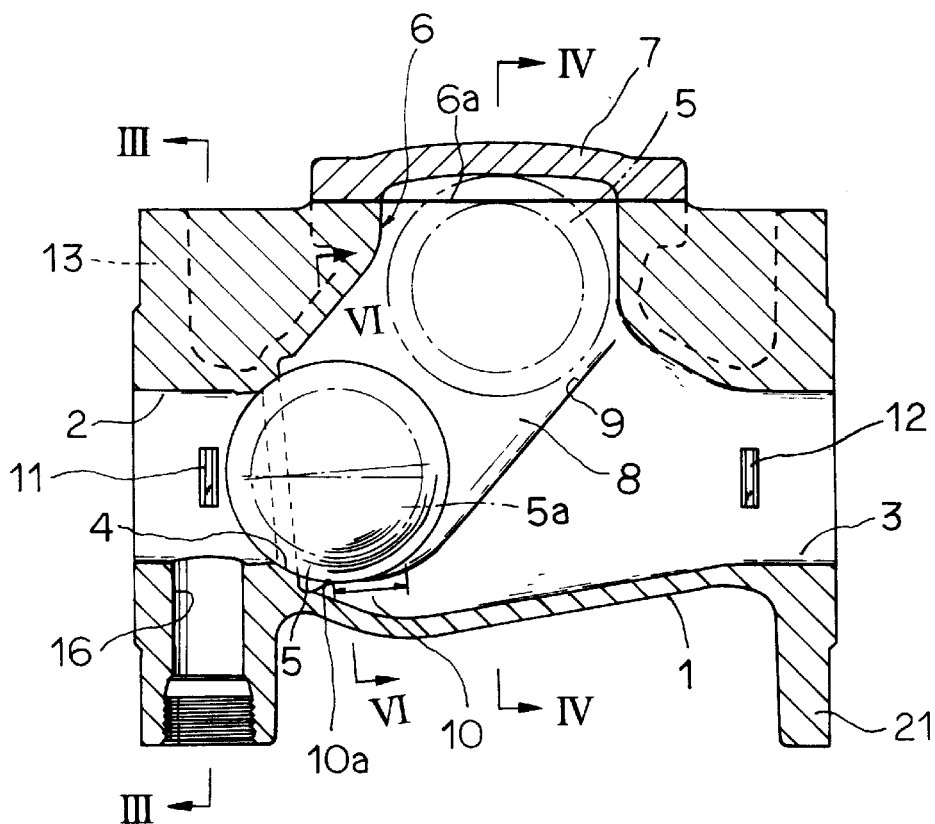
FIG. 1 is a longitudinal section illustrating one example of a ball check valve contemplated by this invention.

As illustrated in FIG. 1, an inlet 2 is formed on the primary side and an outlet 3 on the secondary side respectively of a body 1 of cast iron or stainless steel formed by a casting means. An annular seating part 4 is disposed near the inlet 2, and a turnout path 6 for admitting a ball 5 is formed by the side of a flow path 8. An opening 6a of the turnout path 6 is covered by a cap 7, which is fixed through a bolt and a nut. The opening 6a is given a larger size than the ball 5 and is used for inserting the ball 5 into the flow path 8.

In the diagram, reference numerals 13 and 21 denote flanges provided respectively at the opposite terminals of the body 1 and used for the attachment of a pipe, and reference numeral 16 denotes a communicating path which will be specifically described herein below. Reference numeral 13a in FIG. 3 denotes a connecting hole.

The ball 5 has a metallic sphere 5a closely encompassed with a coat of rubber or synthetic resin. This ball 5 is given an outside diameter larger than the inside diameters of the inlet 2 and the outlet 3.

Figure 2:
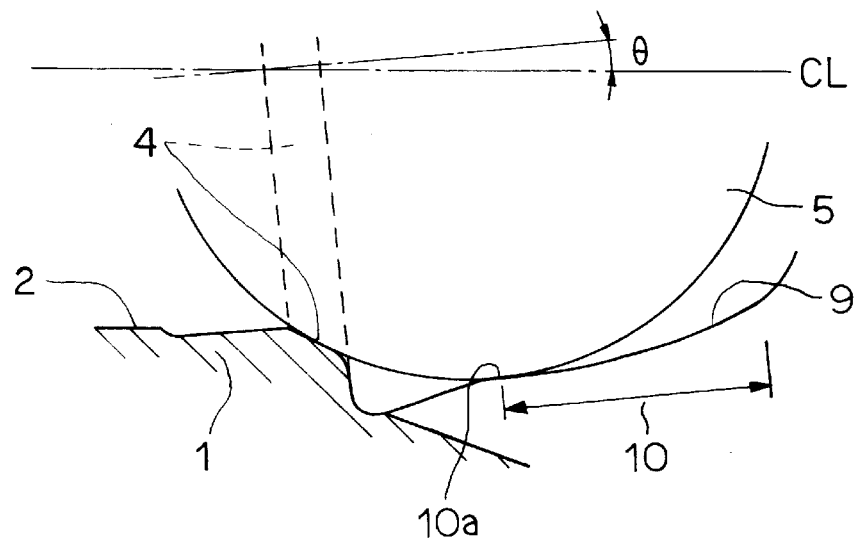
FIG. 2 is a partially cutaway macrograph illustrating a seating part shown in FIG. 1.
Figure 3:
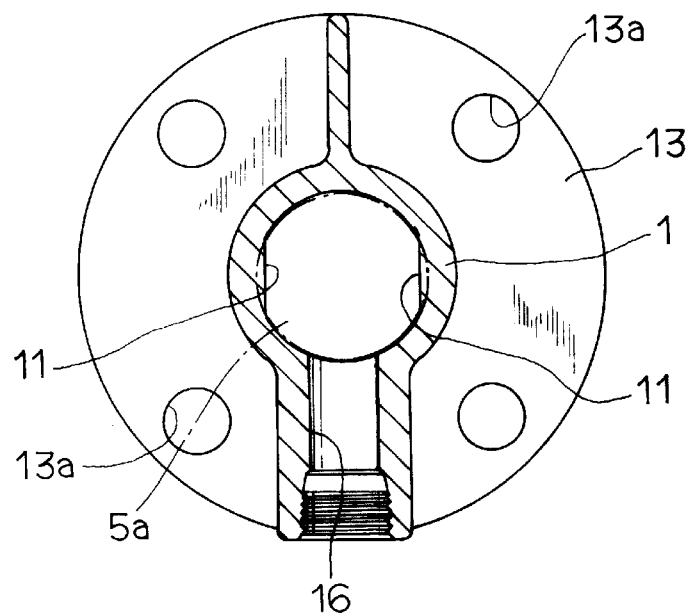
FIG. 3 is a cross section taken through FIG. 1 along the III—III line.
Figure 4:
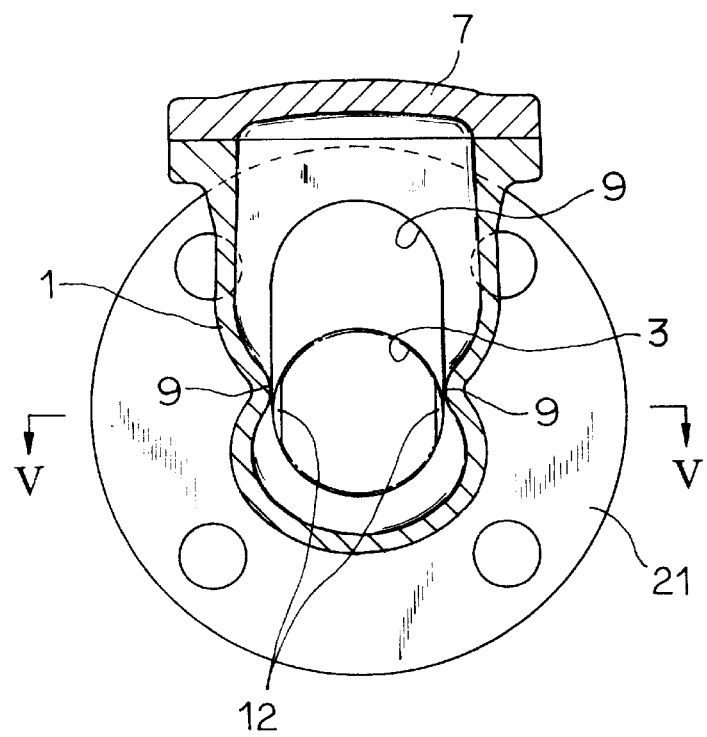
FIG. 4 is a cross section taken through FIG. 1 along the IV—IV line.

As illustrated in FIG. 1 and FIG. 2, the seating part 4 is inclined toward the primary side relative to the center line CL of the flow path 8 which is kept in a horizontally disposed state. The angle θ of this inclination can be suitably set. The same condition may be attained with a horizontal pipe or a vertical pipe alike with the angle θ set at 45 degrees, for example. If the angle of inclination is unduly large, the coat of rubber or synthetic resin will possibly deform with the lapse of time because the pressing force between the ball 5 and the seating part 4 will not be uniform and will be subject to an unbalanced load. The angle θ of inclination, therefore, may be about 30 degrees or more. Advantageously, it is in the approximate range of 5–10 degrees because such an angle produces only a small difference in load and induces no easy deformation. The illustrated example adopts 5 degrees as the angle θ of inclination relative to CL as illustrated in FIG. 2. The angle of this magnitude is effective in seating the ball 5.

The body 1 is provided with a guide part 9 for guiding the ball 5 to the turnout path 6 and preventing it from moving toward the outlet. This guide part 9 is given a width smaller than the outside diameter of the ball 5. Further, for the purpose of preventing the ball 5 from flying out of the body 1, it is effective to give the metallic sphere 5a an outside diameter larger than the inside diameter of the inlet 2, the width of the guide part 9, and the inside diameter of the outlet 3.

Figure 5:
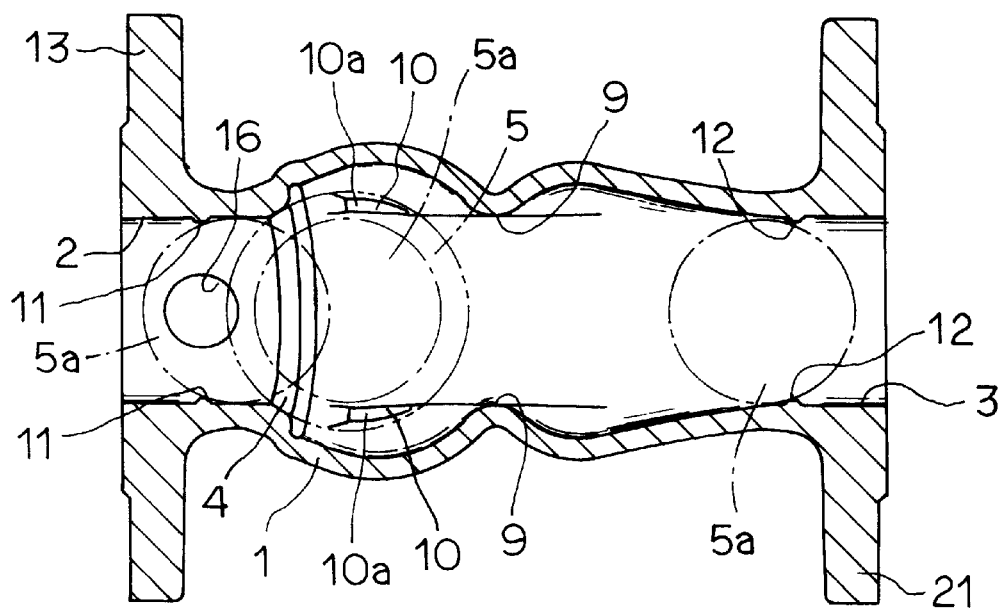
FIG. 5 is a cross section taken through FIG. 4 along the V—V line.
Figure 6:
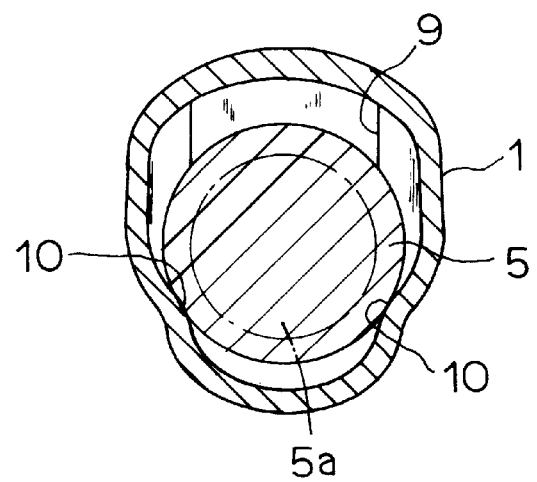
FIG. 6 is a cross section taken through FIG. 1 along the VI—VI line.

Further, the relation of size between the inlet 2 and the outlet 3 and the ball 5 does not need to be limited to the diameter relation mentioned above. The present example contemplates providing the inlet 2 and the outlet 3 respectively with projecting parts 11 and 12 with a view to giving the metallic sphere 5a a larger outside diameter than the projecting parts 11 and 12. The spheres 5a defined with an alternate long and short dash line and illustrated in the laterally opposite parts of FIG. 5 are intended to illustrate the dimensional relation. The spheres, in normal use, do not assume the state illustrated.

The guide part 9 is further provided with an arcuate guiding portion 10 which is inclined toward the primary side for the purpose of guiding the ball 5 to the seating part 4. The ball 5 is rolled as guided by the guide part 9. Further, the guiding portion 10 is provided in the terminal part thereof with a positioning part 10a shaped like a ridge. The ball 5 is rolled along the guiding portion 10, held in a horizontal state, and dropped into the positioning part 10a. The ball 5 in the ensuant state is depressed under its own weight toward the inclined seating part 4 side and enabled to seal the seating part 4 infallibly. In other words, the positioning part 10a is disposed so as to urge the ball 5 toward the inlet 2 side.

The operation of the working example described above will be explained below.

When the ball check valve is used in a horizontal pipe and when the fluid supplied by a pump (not shown) from the primary side is in normal flow, for example, the ball 5 is positioned in the turnout path 6 as indicated by a chain line in FIG. 1. When the pump is stopped and the fluid and the normal flow of the fluid is consequently discontinued, the ball 5 in the turnout path 6 is moved along the guide part 9 toward the valve-closing position and further guided to the arcuate guiding portion 10 and eventually positioned at the positioning part 10a. Consequently, the ball 5 is infallibly set in position in the seating part 4 because it is guided, with the center of gravity thereof shifted slightly toward the primary side, to the seating part 4 in the inclined state and depressed thereon. The ball 5 is accordingly set in place infallibly on the seating part 4. Once the fluid generates a normal flow, the ball 5 is separated from the seating part 4 and retracted as guided by the guide part 9 to the turnout path 6. In this case, the fluid is smoothly supplied from the primary side to the secondary side without inducing a large pressure loss.

The example as cited above illustrates the case of a horizontal pipe. It can be similarly applied to the case of a vertical pipe. In this case, the ball 5 is infallibly seated because it is moved under its own weight.

When the body 1 is a shaped article obtained by casting, for example, only the parts of the shaped article that are in need of dimensional accuracy are finished by machining. Since the required accuracy of the body 1 is attained by machining the guide part 9, the guiding portion 10, or the positioning part 10a in addition to machining the seating part 4, the ball 5 used in a horizontal pipe or a vertical pipe can be set in place infallibly on the seating part 4. The guiding portion 10 does not need to be limited to the arcuate shape mentioned above, but is only required to be so shaped as to incline toward the primary side and guide the ball to the seating part.

Now, two examples illustrating ball check valves contemplated by other aspects of this invention will be described below with reference to FIG. 7–FIG. 11.

In these diagrams, like parts found in the diagrams illustrating the preceding example are denoted by like reference numerals and are omitted from the following description.

Figure 9:
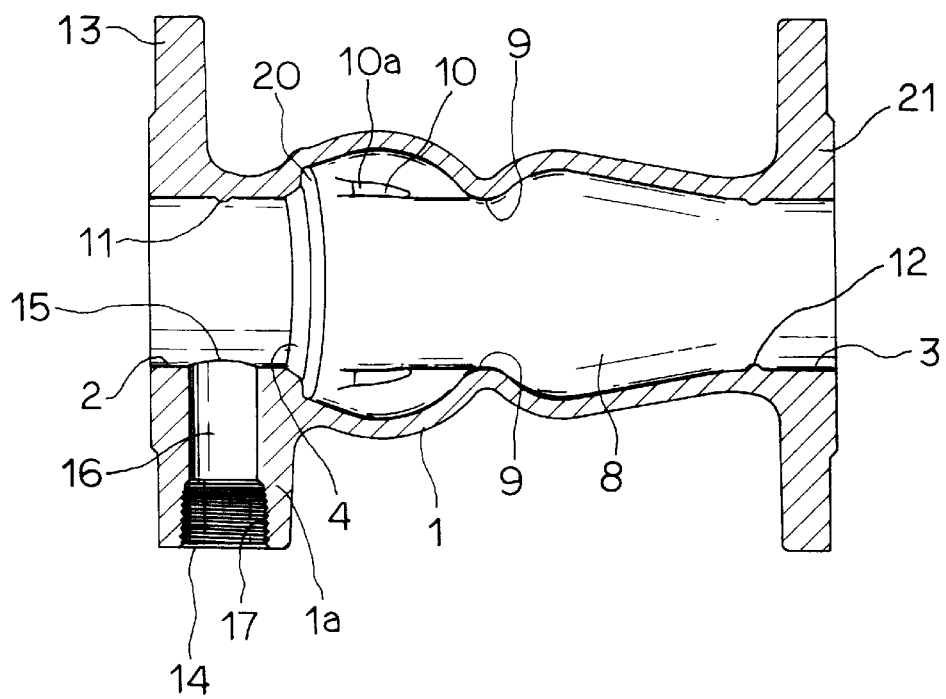
FIG. 9 is a magnified cross section taken through FIG. 7 along the IX—IX line.
Figure 22:
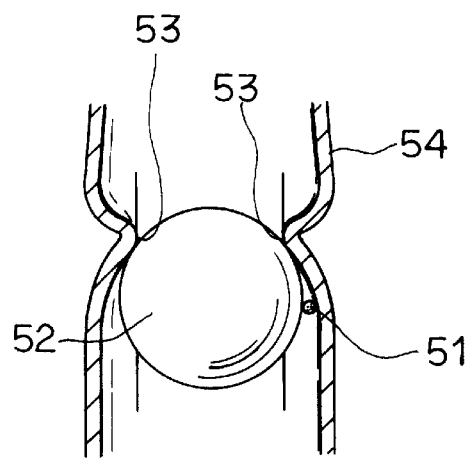
FIG. 22 is a partial cross section illustrating an example of a conventional ball check valve.
Figure 11:
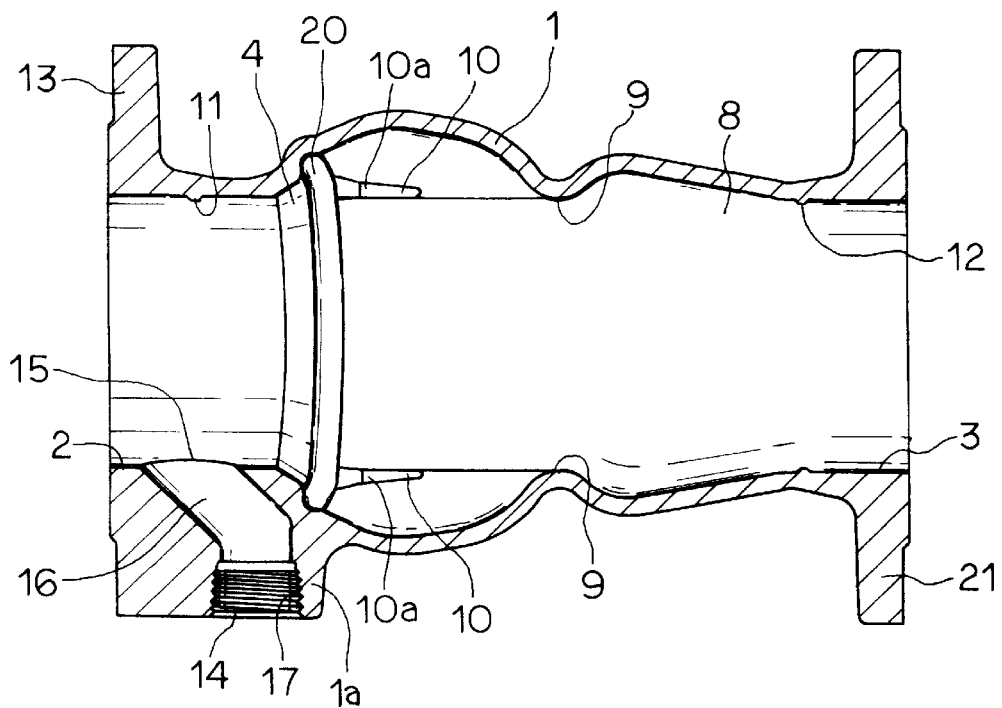
FIG. 11 is a magnified cross section taken through FIG. 10 along the XI—XI line.

With reference to FIG. 9 and FIG. 11, an outside opening 14 is formed on the pipe connecting part (flange) 13 side of the inlet 2 of the body 1 and an inside opening 15 is formed between the inlet 2 and the seating part 4, and the outside opening 14 and the inside opening 15 are allowed to communicate with each other through a communicating path 16. The diameter of this communicating path 16 is so set as to satisfy the conditions for securing the minimum allowable pumping capacity expected of the pump because the communicating path 16 is fated to induce uncalled-for outflow of the fluid during the operation of the pump and consequently obstruct discharge of the fluid and also satisfy the conditions for precluding the extraneous matter entrained by the fluid from clogging the paths because the communicating path 16 is fated to obstruct the closing motion of the check valve when the clogging arises. The outside opening 14 is formed in a projecting part 1a formed by raising part of the body 1 and is provided, in the present example, with a female screw 17 (optionally a male screw).

This communicating path 16 in one case may be disposed in a perpendicular direction relative to the direction of flow and in another case, as illustrated in FIG. 11, may be bent in a manner such that the inside opening 15 occurs on the inlet 2 side, with the projecting part 1a provided with the outside opening 14 disposed toward the seating part 4.

The two cases just mentioned will be described in detail below.

First, in the case illustrated in FIG. 9, the valve used therein has a relatively small diameter such as, for example, 50 mm. When it is connected to a pipe, it is required to be clamped to the four connecting holes 13a (FIG. 7) in the flange 13 by the use of bolts (not shown) and nuts 30 (FIG. 7).

Figure 7:
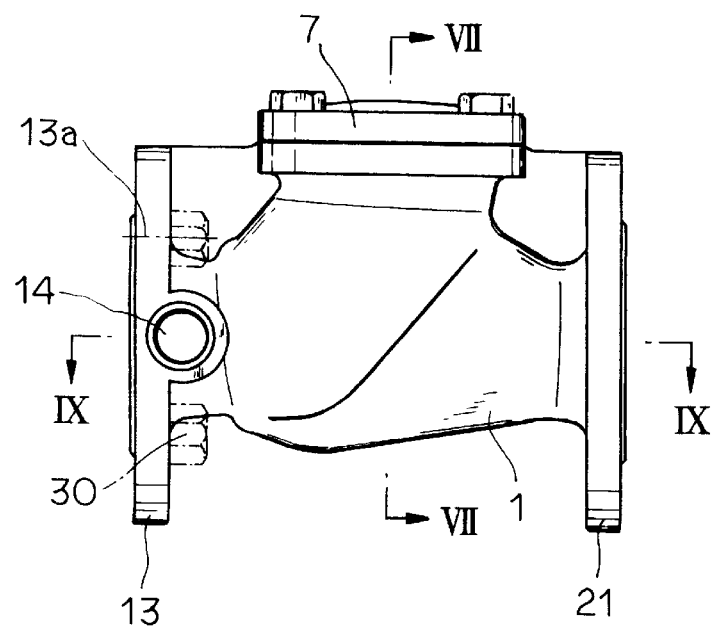
FIG. 7 is a front view illustrating another example of a ball check valve contemplated by this invention.

In this case, in accordance with the condition of clamping illustrated in FIG. 7, the communicating path 16, when the distance between the two nuts is ample as compared with the size of the outside opening 14, is disposed between the two nuts 30 and laid in a perpendicular direction relative to the direction of the flow path so as to adjoin the thick wall part of the flange 13. The thick wall part of the flange 13 is thinned owing to the presence of this communicating path 16. Since the flange 13 and the projecting part 1a are so formed that the adjacent clamping part may assume the specified wall thickness, however, it is made possible to lay the communicating path 16 faithfully to specifications while securing strength necessary for the connection between the flange 13 and the pipe and avoiding altering the interfacial dimensions of the valve body.

In contrast, in the case illustrated in FIG. 11, the valve used therein is relatively large such as, for example, not less than 80 mm. When this valve is connected to the pipe, it is required to be clamped to the eight connecting holes 13b (FIG. 10) in the flange 13 by the use of bolts (not shown) and nuts 30 (FIG. 10).

Figure 10:
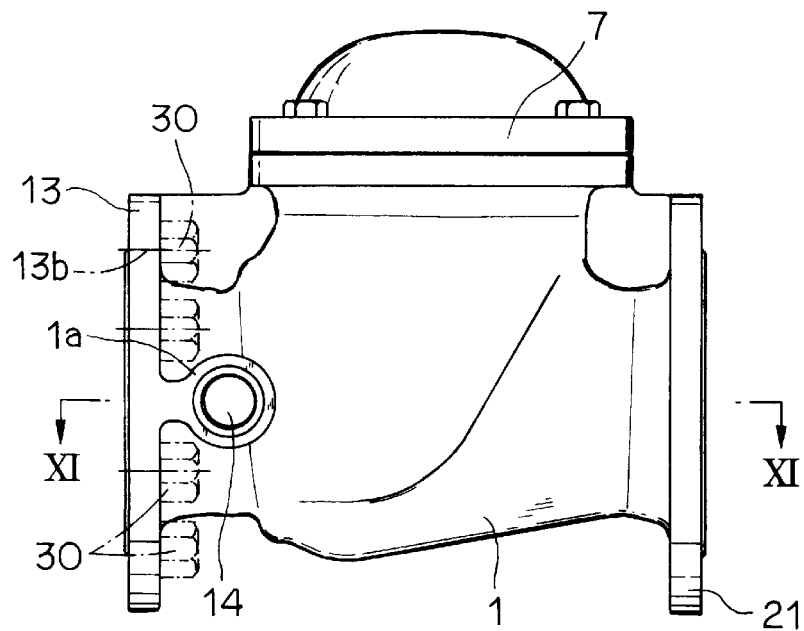
FIG. 10 is a front view illustrating still another example of a ball check valve contemplated by this invention.

In this case, in accordance with the condition of clamping illustrated in FIG. 10, the projecting part 1a provided with the outside opening 14 is disposed near the seating part 4 and the inside opening 15 is allowed to occur on the inlet 2 side by bending the communicating path 16 when the distance between the two nuts 30 which adjoin the projecting part 1a is smaller than the size of the outside opening 14. Since the seating part 4 is inclined with the angle θ toward the primary side in this case, the freedom of choosing the position for setting the inside opening 15 is widened and the ease of machining the communicating part 16 from the standpoint of manufacture is improved.

Since, in any of the conditions mentioned above, the site for the projecting part 1a is so shaped and disposed as to secure a space necessary for clamping the bolts and the nuts 30 in the connection of the flange 13 to the pipe, the connection of the flange 13 and the pipe is attained infallibly by fastening the bolts and the nuts 30.

Then, in the case illustrated in FIG. 11, by tapping the pipe with the bolts driven in from the pipe side instead of clamping the bolts and the nuts 30, it is made possible to dispose the communicating path 16 in a perpendicular direction relative to the direction of the flow path similar to the construction illustrated in FIG. 9, and further facilitate the machining and reduce the cost of production.

Figure 8:
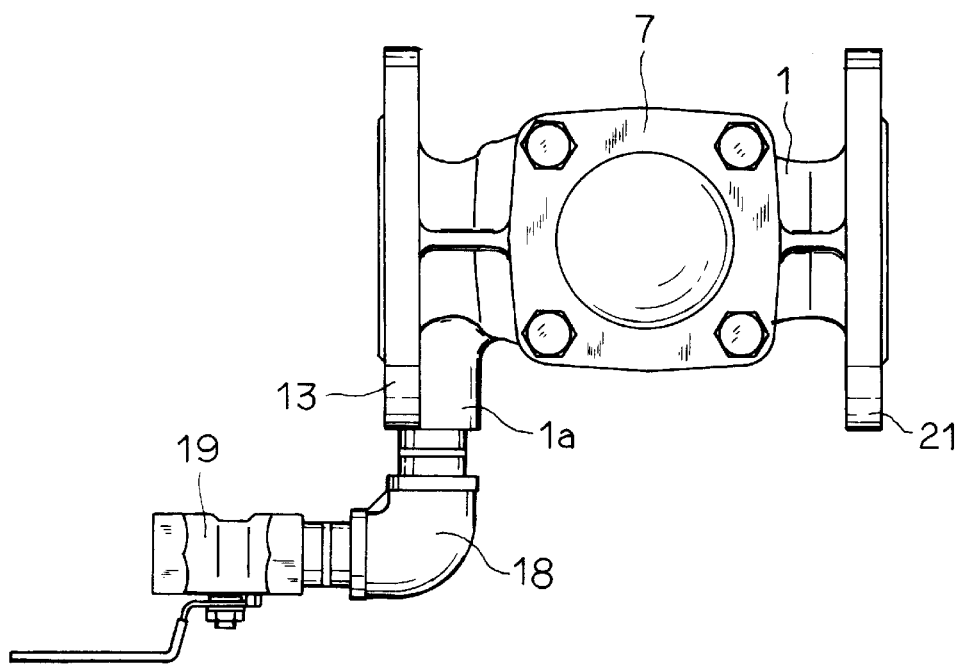
FIG. 8 is a plan view illustrating an example of providing the check valve of FIG. 7 with an on-off valve.

To the female screw 17 of the outside opening 14, an on-off valve 19 is connected through an elbow joint 18 similar to the construction illustrated in FIG. 8.

Generally, the ball check valve constructed as described above is set in place inside a manhole. Particularly, the manhole pumping system, which is designed for alternately actuating two parallel lines each formed of a series of pumping and reverse flow preventing parts, abounds in component elements including a pipe. An alteration in the layout of this system, therefore, incurs a very high cost.

By forming the projecting part 1a on the body 1 which is perpendicular to the longitudinal section connecting the center line of the turnout path 6 of the ball 5 and the center line of the flow path 8, therefore, the system can be made directly applicable to an existing manhole without changing the interfacial dimensions of the valve or altering the layout of the system.

With reference to FIG. 9 and FIG. 11, by forming an annular depressed reservoir 20 for extraneous matter round the periphery on the secondary side of the seating part 4, thereby allowing extraneous matter such as sand to collect therein, it can be rendered difficult for the extraneous matter to be engulfed in the gap between the seating portions of the seating part 4 and the ball 5.

Figure 21:
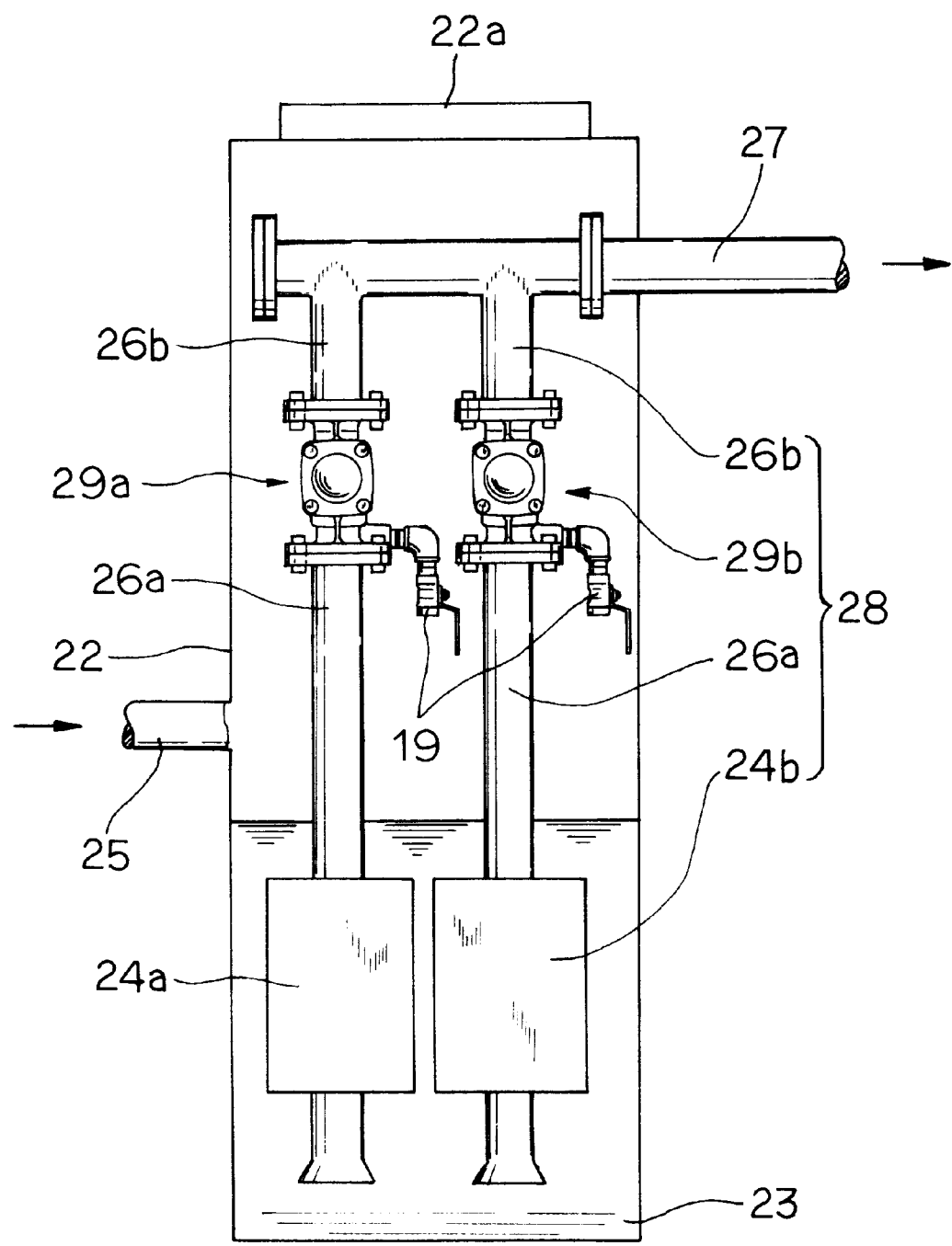
FIG. 21 is an explanatory diagram illustrating one example of a manhole pumping system.

FIG. 21 is an explanatory diagram illustrating one example of the manhole pumping system. This manhole pumping system, for the purpose of discharging to the exterior a fluid 23 stored in a manhole 22 provided with a manhole lid 22a and an inlet pipe 25, is provided with pumps 24a and 24b for alternating the pumping and stopping motions, thereby controlling the fluid 23 in a predetermined amount. A discharging pipe 27 is for discharging to the exterior the fluid 23 advanced by the pumps, and ball check valves 29a and 29b are each interposed between a primary side pipe 26a connected to the discharging pipe 27 and a secondary side pipe 26b and adapted to prevent the discharged fluid from flowing back during stoppage of the pumps.

In this case, two lines of pumping and reverse flow preventing functions 28, formed by including the pump 24a or 24b, the pipes 26a, 26b, and the check valve 29a or 29b, are parallelly disposed, and these lines of pumping and reverse flow preventing functions 28 are alternately operated.

Here, the operation of this example will be described below.

With reference to FIG. 21, when the ball check valves according to this invention are used in the pumping system for the manhole 22, the ball check valves 29a and 29b are disposed above the primary side pipes of the two lines of submersible pumps. The pumps 24a and 24b are operated to control the fluid 23 stored in the manhole 22 constantly in a predetermined amount. After the pumps 24a and 24b are stopped, the ball check valves 29a and 29b assume a stopping state and prevent the fluid from flowing back.

In this case, the two pumps 24a and 24b are adapted to be operated alternately. When either of the two lines happens to develop trouble, the remaining line prevents the system from incurring possible hardship.

When the portions of water on the primary sides of the ball check valves 29a and 29b are extracted as by the pumps 24a and 24b preparatory to stopping the pumps, the ambient air is introduced from the on-off valves 19 into the interiors of the primary side pipes 26a via the communicating paths 16 of the ball check valves 29a and 29b and, at the same time, each ball 5 in the turnout path 6 is moved under its own weight along the guide part 9 in consequence of the stop of the normal flow of the fluid, guided by the guiding portion 10, and set in place at the positioning part 10a. Then, the ball 5, in a state having the center of gravity thereof shifted slightly toward the primary side, is guided to and depressed against the seating part 4 in the inclined state and, at the same time, the ball 5 is fastened to the seating part 4 infallibly because the pressure on the primary side is smaller than the pressure on the secondary side and the water head pressure of the secondary side pipe 26b consequently manifests the function of checking the flow.

In other words, by the air which is taken in through the communicating path 16, the fluid inside the primary pipe 26a is extracted and the ball check valve is consequently caused to generate a pressure difference between the primary side and the secondary side thereof and bring the ball 5 and the seating part 4 into a perfectly closed state.

Then, when the pumps 24a and 24b are set driving to propel the fluid, they are not reduced in capacity because the air in the primary side pipes 26a is extracted to the exterior from the communicating paths 26 through the on-off valves 19. When the fluid begins its normal flow, the fluid is supplied from the primary side to the secondary side and discharged through the discharging pipe 27 without inducing pressure loss.

Now, one example of the ball check valve according to another aspect of this invention will be specifically described below with reference to FIG. 12–FIG. 20. In the diagrams, like parts found in the diagrams illustrating the example described above are denoted by like reference numerals and are omitted from the following description.

Figure 12:
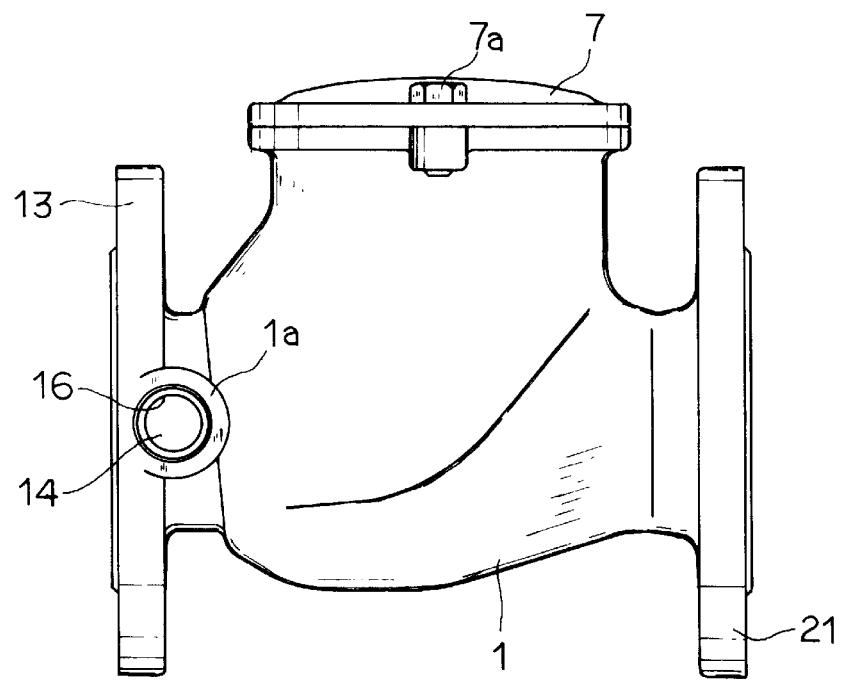
FIG. 12 is a front view illustrating yet another example of a ball check valve contemplated by this invention.
Figure 13:
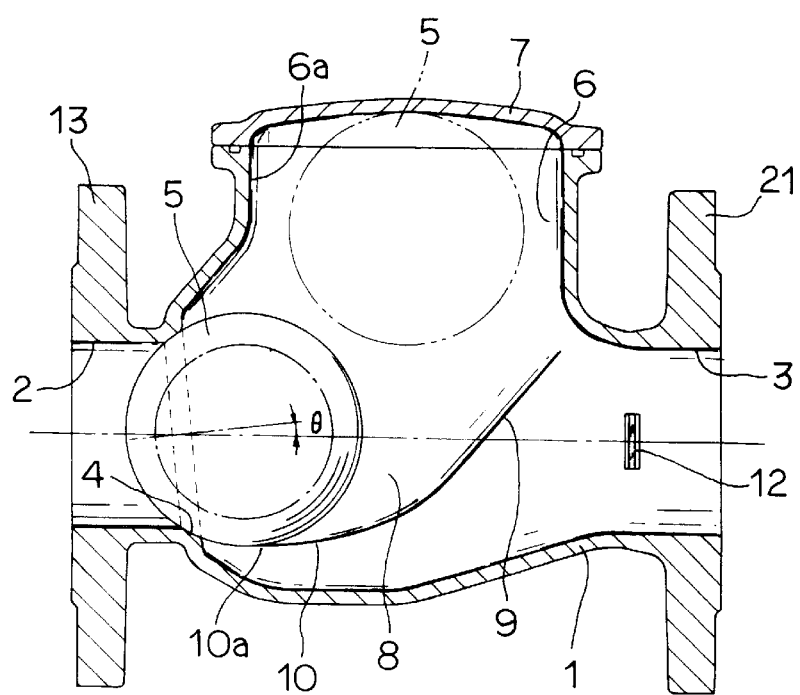
FIG. 13 is a longitudinal section taken through FIG. 12.

With reference to FIG. 13, the ball check valve is obtained by forming an inlet 2 on the primary side and an outlet 3 on the secondary side of a body 1 formed of cast iron, stainless steel, or high-function resin by a casting technique (such as, for example, the lost-wax process), disposing an annular seating part 4 at a position approximating closely to the inlet 2, forming a turnout path 6 for retracting a ball 5 outside a flow path 8, and covering an opening 6a of the turnout path 6 with a cap 7 fixed with the aid of bolts (not shown) and nuts 7a (FIG. 12).

Since the opening 6a of the turnout path 6 is formed in a size larger than the outside diameter of the ball 5, the ball 5, while positioned in the turnout path 6, is allowed, when the pump is stopped, to fall as guided by the guide part 9 and land accurately on the seating part 4, even when extraneous matter such as a pebble is nipped therein.

Figure 14:
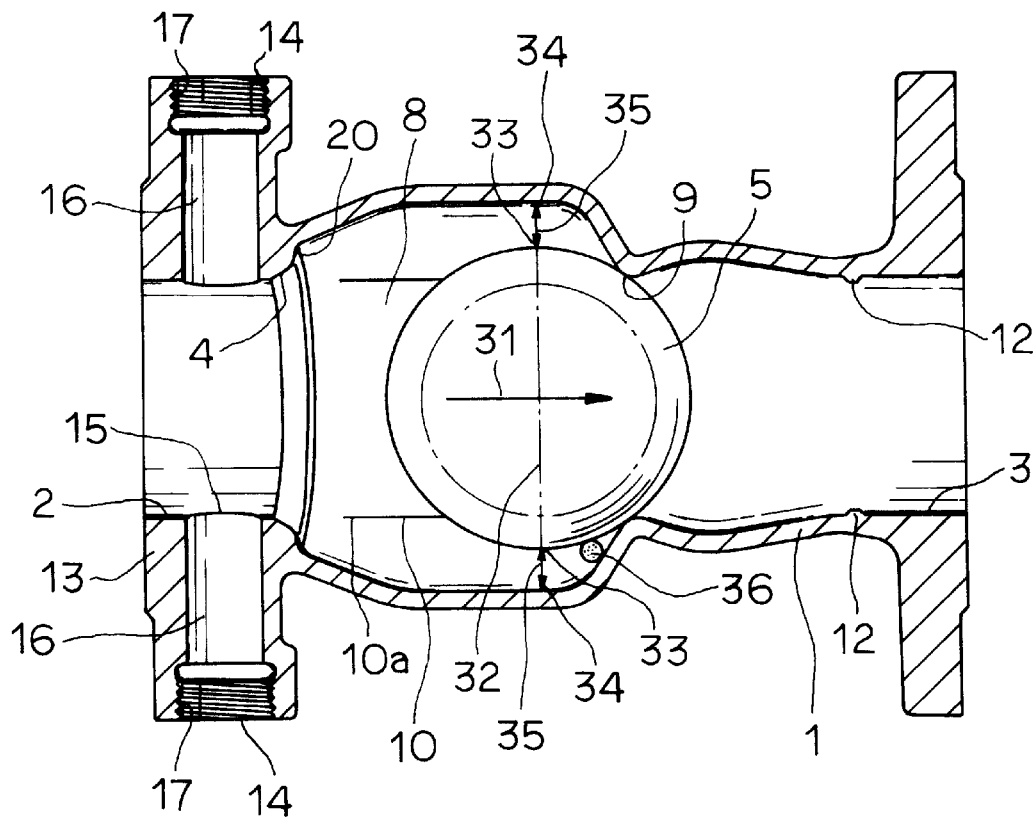
FIG. 14 is a magnified transverse section taken through FIG. 12.
Figure 15:
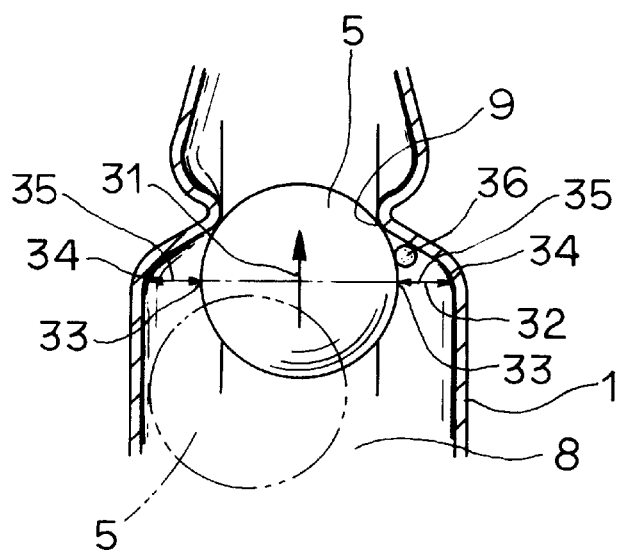
FIG. 15 is a partial cross section taken through FIG. 14.
Figure 17:
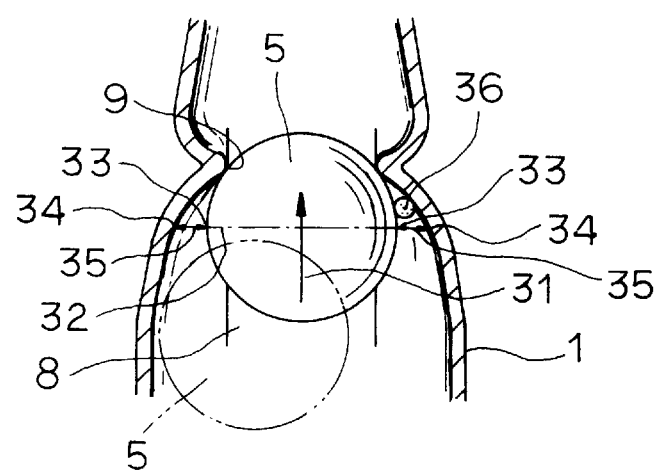
FIG. 17 is a partial cross section taken through FIG. 16.
Figure 18:
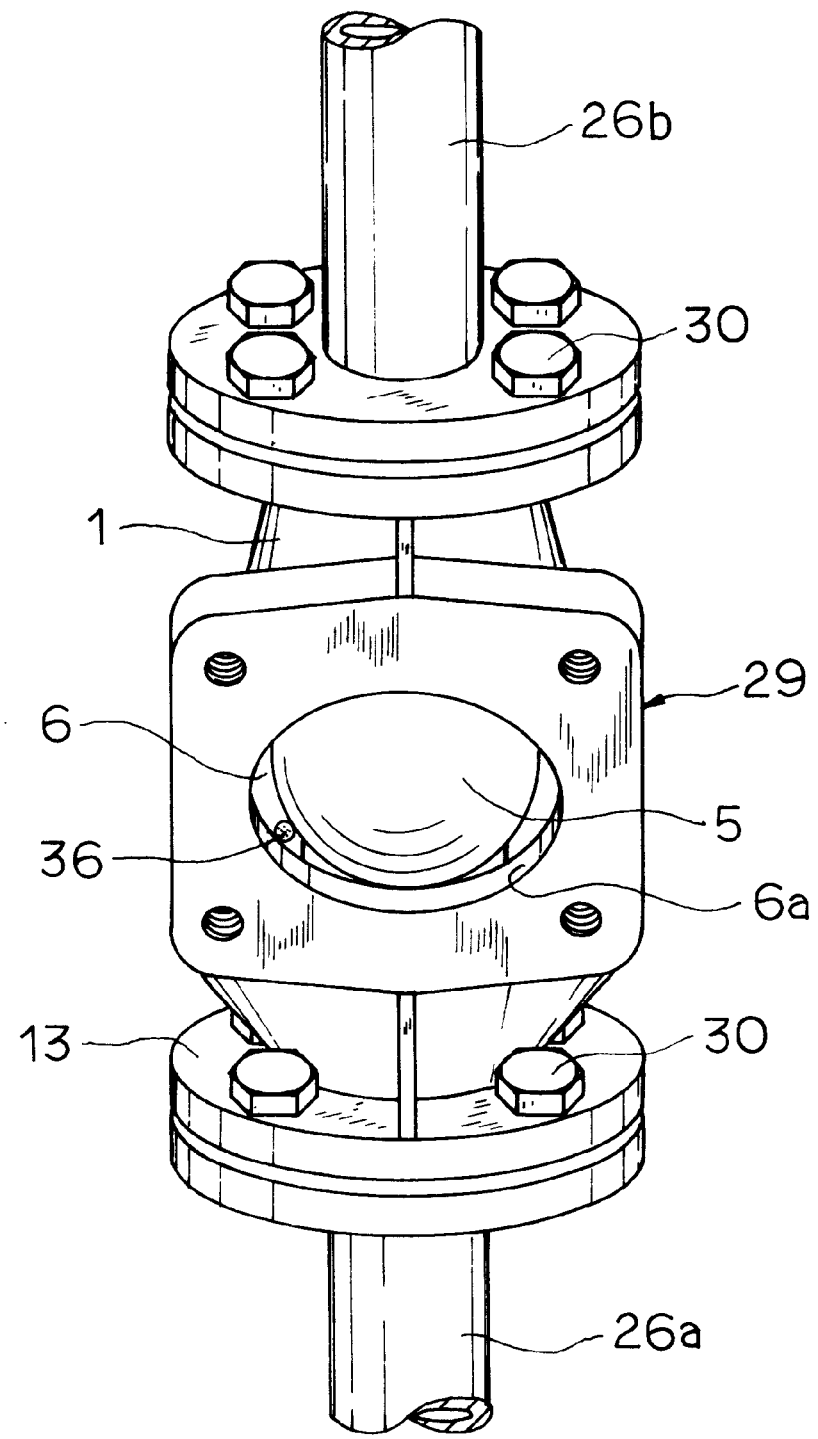
FIG. 18 is a perspective view illustrating the appearance of the ball check valve of this invention, with the cap thereof removed to show the interior to advantage.

Further, a gap 35 (FIG. 14), which occurs between an apex 33 of a longitudinal line 32 of the ball 5 intersecting roughly perpendicularly to a direction 31 of the flow path of the fluid and an inner surface 34 of the guide part 9 opposed to the longitudinal line 32 as illustrated in FIG. 15 and FIG. 17 while the ball 5 is being guided by the guide part 9, assumes a size larger than the size of the extraneous matter 36, such as a pebble, contained in the fluid.

Here, the extraneous matter such as a pebble is thought to have a diameter in the approximate range of 5–10 mm, depending on the condition of use of the manhole pumping system operated for sewage disposal. The extraneous matter comes in various shapes. When it has the shape of a wedge, for example, it exerts a more adverse effect. While the present example presumes the gap 35 to have a minimum size of 12 mm, this size has only to be so generous as to exceed 10 mm, the maximum value of the expected diameter of the extraneous matter. By suitably setting the gap 35 in accordance with the size of the extraneous matter 36 and the size of the ball check valve, the ball 5 is enabled to produce a smooth motion and manifest the function as a check valve.

Incidentally, the term "inner surface 34 of the guide part" mentioned above does not need to be applied exclusively to the portions of the guide part 9 but may embrace the inner surface of the body near the ball 5 which is rolling as guided by the guide part 9. The ball check valve in this invention, therefore, causes the gap 35 between the apex 33 of the center line 32 of the ball 5 and the inner surface of the body in the range in which the ball 5 is rolled to be set at a magnitude that exceeds the size of the extraneous matter 36, such as a pebble, which is entrained by the fluid.

The seating part 4 is inclined toward the primary side relative to the center line of the flow path. When the valve is used as disposed horizontally, the ball 5, while moving to the closing position, is guided, in a state having the center of gravity thereof slightly shifted toward the primary side, to the seating part 4 in the inclined state and brought into pressure contact therewith. Thus, the ball 5 is seated perfectly.

Though the angle of this inclination can be suitably set, it is preferred to be in the approximate range of 5–10 degrees. The present example adopts 5 degrees as the angle θ of this inclination.

Figure 16:
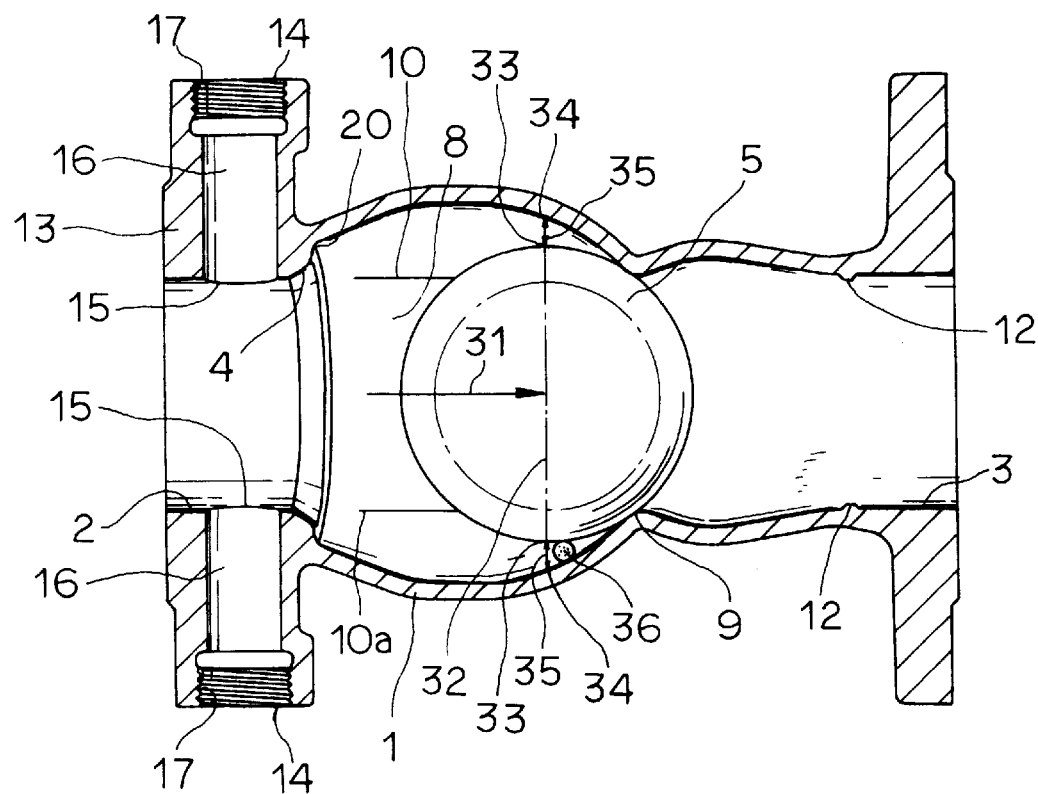
FIG. 16 is a transverse section illustrating a further example of a check valve.

This example contemplates having two communicating paths 16 disposed at two positions as opposed to each other on the inlet 2 side of the body 1 as shown in FIG. 14 or FIG. 16. The reason for disposing these communicating paths 16 as opposed to each other is that the ball check valve may be attached to a vertical pipe or a horizontal pipe and the communicating paths 16 may be suitably selected for use depending on the condition of disposition.

It is permissible to keep the outside openings 14 of the communicating paths 16 normally in a closed state and open them when the communicating paths 16 are required to be used.

Figure 19:
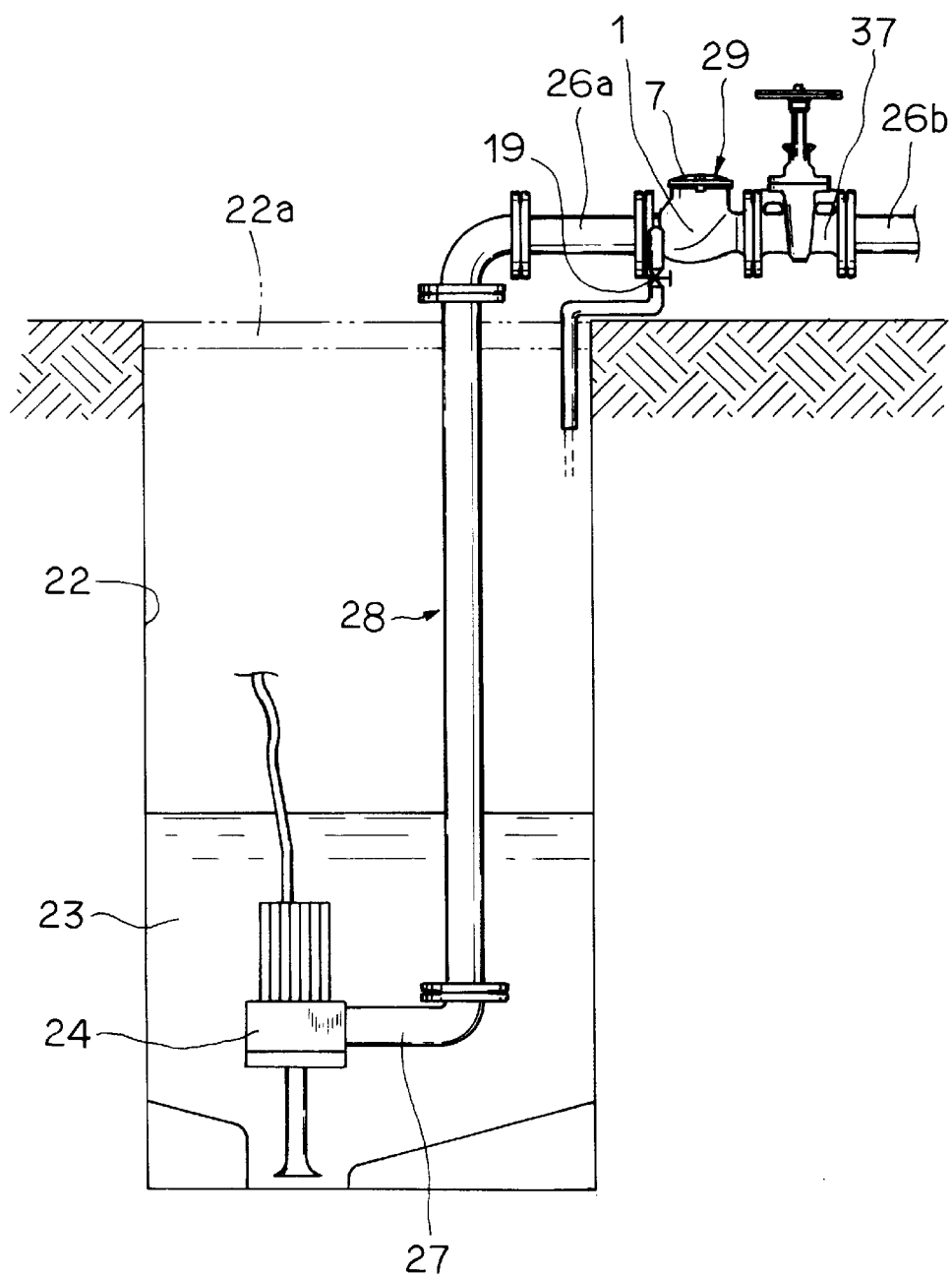
FIG. 19 is an explanatory diagram illustrating the condition of a horizontal pipe to which the ball check valve contemplated by this invention is attached.
Figure 20:
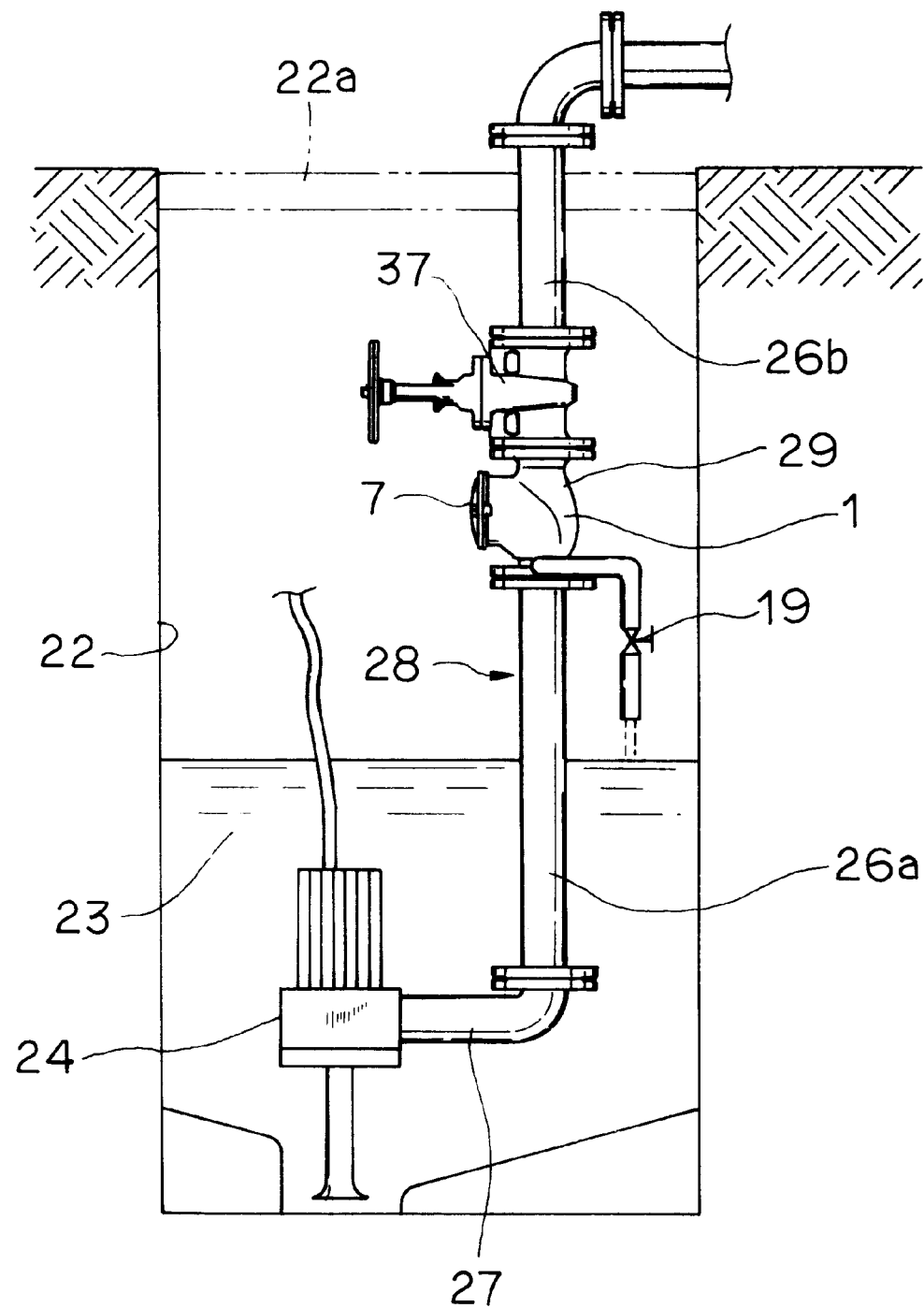
FIG. 20 is an explanatory diagram illustrating the condition of a vertical pipe to which the ball check valve contemplated by this invention is attached.

FIG. 19 illustrates a case of using the ball check valve in a horizontal pipe and FIG. 20 a case of using it in a vertical pipe. These diagrams depict a manhole lid 22a and a manhole pumping system for discharging to the exterior a fluid 23 stored in a manhole 22. Specifically, each system comprises a pump 24 alternating pumping and stopping motions for the purpose of controlling the stored fluid 23 to a predetermined amount, a discharging pipe 27 for discharging to the exterior the stored fluid 23 propelled by the pump, and a ball check valve 29 interposed between a primary side pipe 26a connected to the discharging pipe 27 and a secondary side pipe 26b and adapted to prevent the discharged fluid from flowing back while the pump is in a stopped state.

In each case, one line of pumping and reverse flow preventing functions 28 is disposed, which comprises a pump 24, pipes 26a and 26b, and a check valve 29.

The reference numeral 37 in each diagram denotes an on-off valve disposed on the secondary side of the ball check valve. This on-off valve 37 is a gate valve, a ball valve or the like valve and is operated in a closed state during the course of maintenance.

Further, as illustrated in FIG. 19 and FIG. 20, an on-off valve 19 such as a ball valve is connected to the female screw 17 of the outside opening 14 through the elbow joint.

The on-off valve 19, which may be disposed in a horizontal pipe illustrated in FIG. 19 or in a vertical pipe illustrated in FIG. 20 alike, is intended to adjust the propelling capacity of the pump and the amount of air to be extracted, depending on the individual manhole pumping system.

Here, the operation of the example of FIG. 19 and FIG. 20 will be described.

When the ball check valve according to this invention is used in the pumping system for the manhole 22, for example, the ball check valve 29 is disposed at one end of the primary side pipe 26a of one line of submersible pump 24 and the pump 24 is operated to draw the fluid 23 stored in the manhole so as to control the fluid 23 constantly at a fixed volume. When the pump 24 is stopped, the ball check valve 29 assumes a closed state and prevents the fluid from flowing back.

To begin with, as soon as the ambient air is taken in from the on-off valve 19 through the communicating path 16 of the ball check valve 29 into the primary side pipe 26a preparatory to extracting the portion of water on the primary side of the ball check valve 29, thereby stopping the pump 24, the fluid ceases its normal flow and the ball 5 in the turnout path 6 is moved under its own weight along the guide part 9, directed by the guiding portion 10, and set in place on the positioning part 10a. Consequently, the ball 5, in a state having the center of gravity thereof slightly shifted toward the primary side, is guided to and pressed against the seating part 4 in an inclined state. Immediately, the ball 5 is set fast in place on the seating part 4 infallibly because the pressure on the primary side is smaller than the pressure on the secondary side and consequently the water head pressure of the secondary side pipe 26b manifests the function of stopping the reverse flow of the fluid.

Then, when the pump 24 is operated to propel the fluid, it is not reduced in capacity because the air in the primary side pipe 26a is forwarded through the communicating path 16 and extracted to the exterior via the on-off valve 19. When the fluid begins to flow normally, it is supplied from the primary side to the secondary side without inducing a noticeable pressure loss and discharged through the secondary side pipe 26b because the ball 5 is separated from the seating part 4 and retracted in the direction of the turnoff path 6 as led by the guide part 9.

In this case, as illustrated in FIG. 15 and FIG. 17, the gap 35 between the apex 33 of the longitudinal line 32 of the ball 5 nearly perpendicularly intersecting the direction 31 of the flow path of the fluid and the inner surface 34 of the guide part 9 opposed to the longitudinal line 32 is given a size larger than the size of the extraneous matter 36, such as a pebble, entrained in the fluid. Even when the extraneous matter 36 such as a pebble flows into the ball check valve and gets stuck between the ball 5 and the inner surface 34 of the guide part 9, the ball 5, while falling under its own weight, is prevented from being stuck by the extraneous matter 36 but allowed to fall continuously in concert with the extraneous matter 36. Thus, the possibility of the ball 5 being stuck by the extraneous matter 36 is precluded without fail.

The various examples, as cited above, have used the ball check valve of this invention in a pumping device such as the manhole pumping system. The ball check valve otherwise can be applied to a wide variety of submersible lines which are intended to store and circulate fluids such as rainwater.

According to this invention, therefore, even when the ball check valve is used in a horizontal pipe, it can manifest the same ability to seal the fluid as in a vertical pipe. Even during the absence of load, the ball is infallibly seated by the back pressure of the fluid and enabled to prevent the fluid from reverse flow without fail.

Further, this invention permits production of a ball check valve possessed of the function of extracting air without requiring any enlargement of the ball check valve and consequently contributes to the compaction of the ball check valve.

The communicating path, by suitably setting the diameter thereof at a size fit for manifesting the function of extracting air and precluding obstruction by the extraneous matter entrained by the fluid, is enabled to retain the function of pumping perfectly.

Further, according to this invention, the extraneous matter, such as a pebble, which is suffered to reach a position at which it is liable to be nipped between the ball and the guide part in the body is prevented from being engulfed between the ball and the guide part. The ball, therefore, is allowed to move under its own weight to the seating part in the body without fail and consequently enabled to manifest an function as a ball check valve for a long time without inducing the otherwise possible fluid leakage.

Moreover, the ball check valve of this invention permits the construction of a pumping device which is applicable to the existing manhole and manifests conspicuous effects such as interchangeability with a conventional check valve.

What is claimed is:

1. A ball check valve comprising:
   a body having a primary side with an inlet, a secondary side with an outlet, a flow path between said inlet and said outlet, a turnout path diverging from said flow path, and a pipe connecting part at said inlet;
   a ball in said body;
   a seating part for seating said ball, said seating part being disposed in said inlet of said body; and
   a guide part for guiding said ball, from a position of said ball when seated at said seating part, to be retracted into said turnout path;
   an outside opening formed adjacent to said pipe connecting part body;
   an inside opening between said inlet and said seating part; and
   a communicating path permitting communication between said outside opening and said inside opening.

2. The ball check valve of claim 1, wherein said communicating path is disposed in a perpendicular direction relative to a direction of said flow path so as to extend through a thick wall part of said pipe connecting part, said pipe connecting part comprising a flange.

3. The ball check valve of claim 2, wherein said ball comprises a metallic sphere enclosed by a coat of rubber or synthetic resin.

4. The ball check valve of claim 1, wherein said outside opening is adjacent to said seating part and said communicating path bends.

5. The ball check valve of claim 4, wherein said ball comprises a metallic sphere enclosed by a coat of rubber or synthetic resin.

6. The ball check valve of claim 1, wherein said communicating path is disposed in a perpendicular direction relative to a direction of said flow path and a tap of a bolt is clamped from a piping side.

7. The ball check valve of claim 6, wherein said ball comprises a metallic sphere enclosed by a coat of rubber or synthetic resin.

8. The ball check valve of claim 1, wherein said ball comprises a metallic sphere enclosed by a coat of rubber or synthetic resin.

9. A pumping apparatus for discharging a fluid from a storage tank, comprising:
   a pump operably connected with said storage tank and capable of alternating between pumping and stopping pumping for controlling fluid in said storage tank to a predetermined amount;
   piping connected with said pump for discharging fluid pumped by said pump to the exterior of said storage tank; and
   a ball check valve according to claim 1 disposed on said piping and adapted to prevent the discharged fluid from reversely flowing during stopping of said pump.

10. The pumping apparatus of claim 9, and further comprising a further said pump, further said piping and a further said ball check valve disposed in parallel with and operating alternately with the first said pump, the first said piping and the first said ball check valve so as to alternate between pumping and reverse flow preventing functions.

11. A ball check valve comprising:
a body having a primary side with an inlet, a secondary side with an outlet, a horizontal flow path having a direction between said inlet and said outlet, and a turnout path diverging from said flow path;
a ball in said body;
a seating part for seating said ball, said seating part being disposed in said inlet of said body and inclined toward said primary side with respect to said horizontal flow path;
a guide part for guiding said ball to said seating part, said guide part having an inside surface; and
a gap larger than 10 mm, which is an approximate maximum diameter of extraneous matter, between a point on the surface of said ball on a longitudinal line of said ball extending perpendicularly to the direction of said flow path and said inside surface of said guide part.

12. The ball check valve of claim 11, wherein said longitudinal line is a diameter of said ball.

13. The ball check valve of claim 12, wherein said ball comprises a metallic sphere enclosed by a coat of rubber or synthetic resin.

14. The ball check valve of claim 11, wherein said ball comprises a metallic sphere enclosed by a coat of rubber or synthetic resin.

15. A pumping apparatus for discharging a fluid from a storage tank, comprising:
a pump operably connected with said storage tank and capable of alternating between pumping and stopping pumping for controlling fluid in said storage tank to a predetermined amount;
piping connected with said pump for discharging fluid pumped by said pump to the exterior of said storage tank; and
a ball check valve according to claim 11 disposed on said piping and adapted to prevent the discharged fluid from reversely flowing during stopping of said pump.

16. The pumping apparatus of claim 15, and further comprising a further said pump, further said piping and a further said ball check valve disposed in parallel with and operating alternately with the first said pump, the first said piping and the first said ball check valve so as to alternate between pumping and reverse flow preventing functions.

* * * * *